United States Patent [19]
Andre et al.

[11] Patent Number: 5,454,402
[45] Date of Patent: Oct. 3, 1995

[54] HYDRAULICALLY EFFICIENT RIBBED PIPE HAVING OPENINGS

[75] Inventors: James R. Andre, Newport Beach; Larry Daniels, Novato, both of Calif.

[73] Assignee: W.E. Hall Company, Newport Beach, Calif.

[21] Appl. No.: 235,684

[22] Filed: Apr. 29, 1994

Related U.S. Application Data

[60] Continuation of Ser. No. 718,333, Jun. 18, 1991, abandoned, which is a division of Ser. No. 566,119, Aug. 9, 1990, abandoned, which is a division of Ser. No. 352,411, May 16, 1989, Pat. No. 4,964,440, which is a division of Ser. No. 260,816, Oct. 21, 1988, Pat. No. 4,838,317.

[51] Int. Cl.$^6$ ........................................ F16L 09/16
[52] U.S. Cl. ................ 138/154; 138/122; 138/135; 138/173
[58] Field of Search ................... 138/37, 39, 103, 138/121, 122, 173, 177, 154, 178, 129, 134, 135, 172, 105; 137/1, 2, 8, 9; 405/150

[56] References Cited

U.S. PATENT DOCUMENTS

| | | | |
|---|---|---|---|
| 1,263,340 | 4/1918 | Silk | 138/154 |
| 3,224,814 | 12/1965 | Fisher | 138/121 |
| 3,572,394 | 3/1971 | Davis | 138/154 |
| 3,731,711 | 5/1973 | Bauer | 138/178 |
| 4,161,194 | 7/1979 | Nyssen | 138/154 |
| 4,161,811 | 7/1979 | Nyssen | 138/173 |
| 4,790,686 | 12/1988 | Cheist et al. | 405/157 |
| 4,852,616 | 8/1989 | Holcomb | 138/173 |

FOREIGN PATENT DOCUMENTS 42213  2/1908  France.

Primary Examiner—James E. Bryant, III
Attorney, Agent, or Firm—Stetina Brunda & Buyan

[57] ABSTRACT

A hydraulically efficient metal pipe particularly adapted for use in storm drain and sanitary sewer applications which is adapted for use with a self-supporting interior inert protective lining. The pipe has a channeled wall defining a plurality of outwardly projecting structural ribs and a hydraulically smooth interior surface. The ribs are preferably of a helical configuration and the channels which are formed interiorly thereof are generally either square or rectangular in cross-section and are open along the interior surface of the pipe. The walls defining the ribs can be tapered inwardly to form triangular-shaped channels so as to define an anchor throughout the length of the pipe for securing thereto a smooth interior lining of corrosion-resistant protective material.

2 Claims, 7 Drawing Sheets

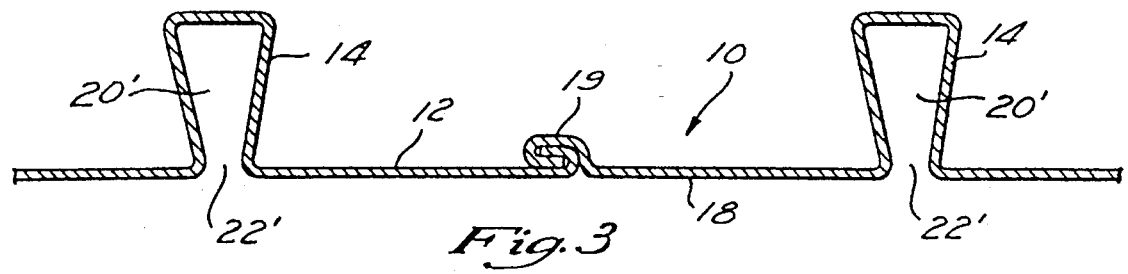
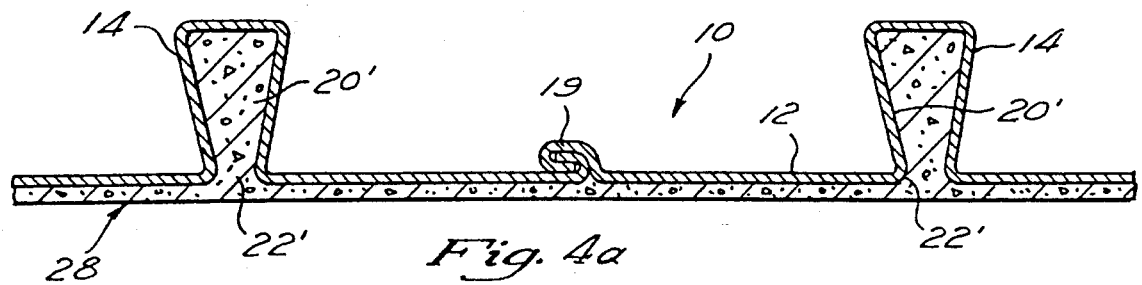
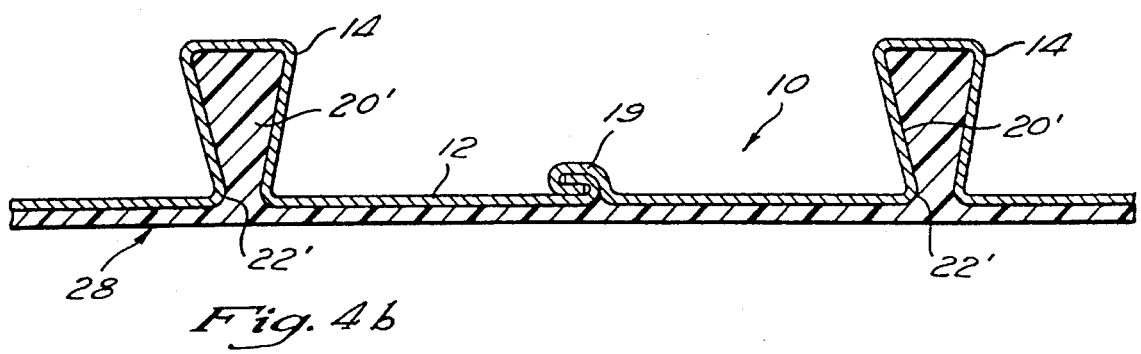
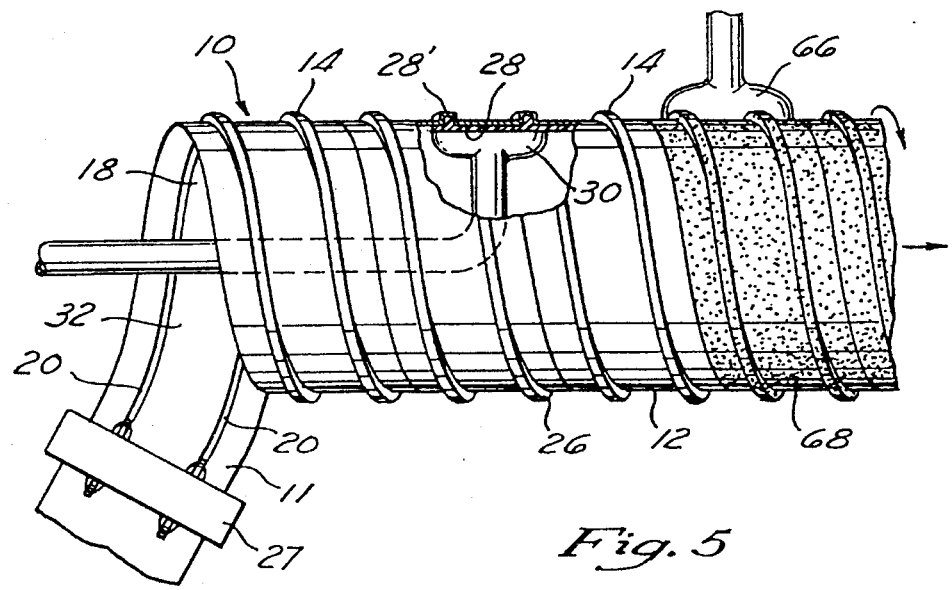

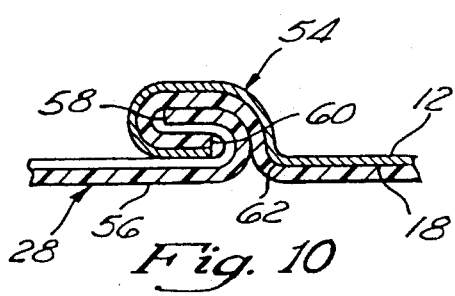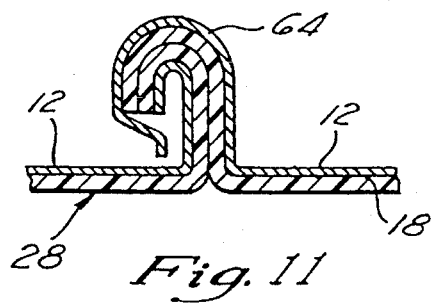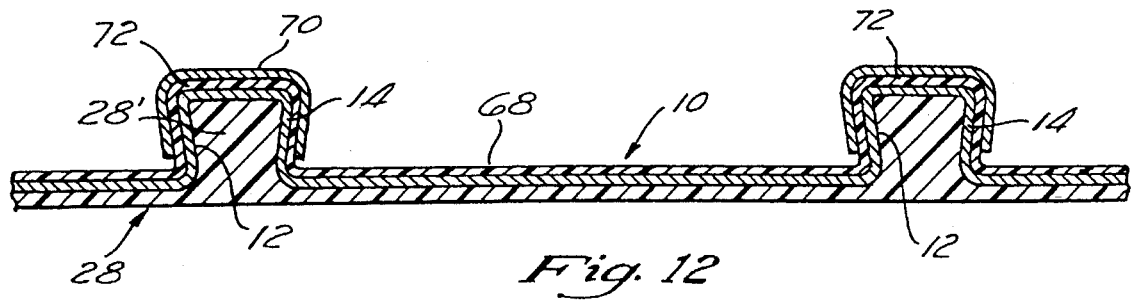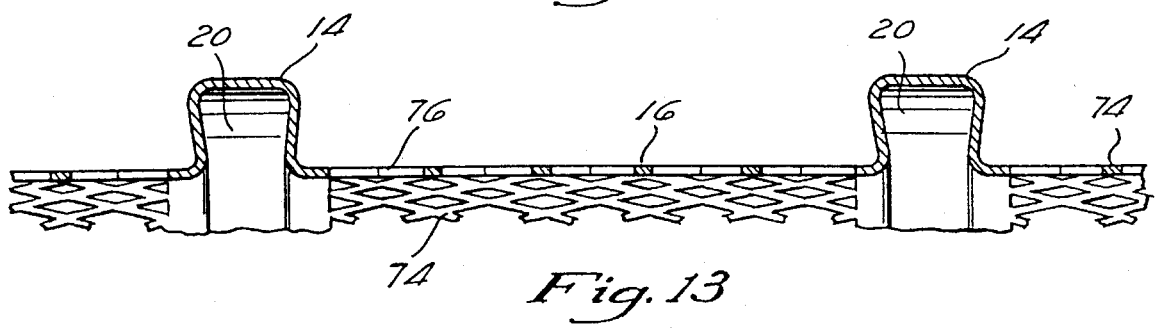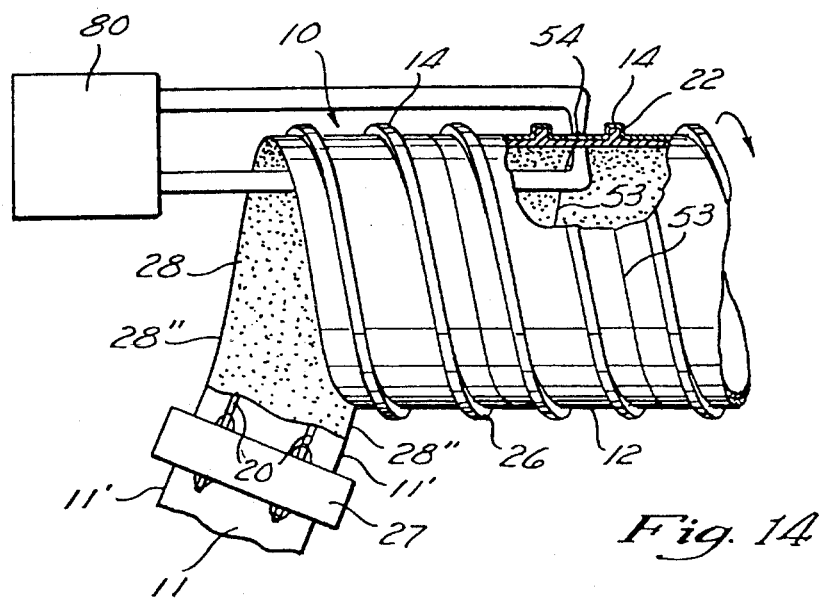

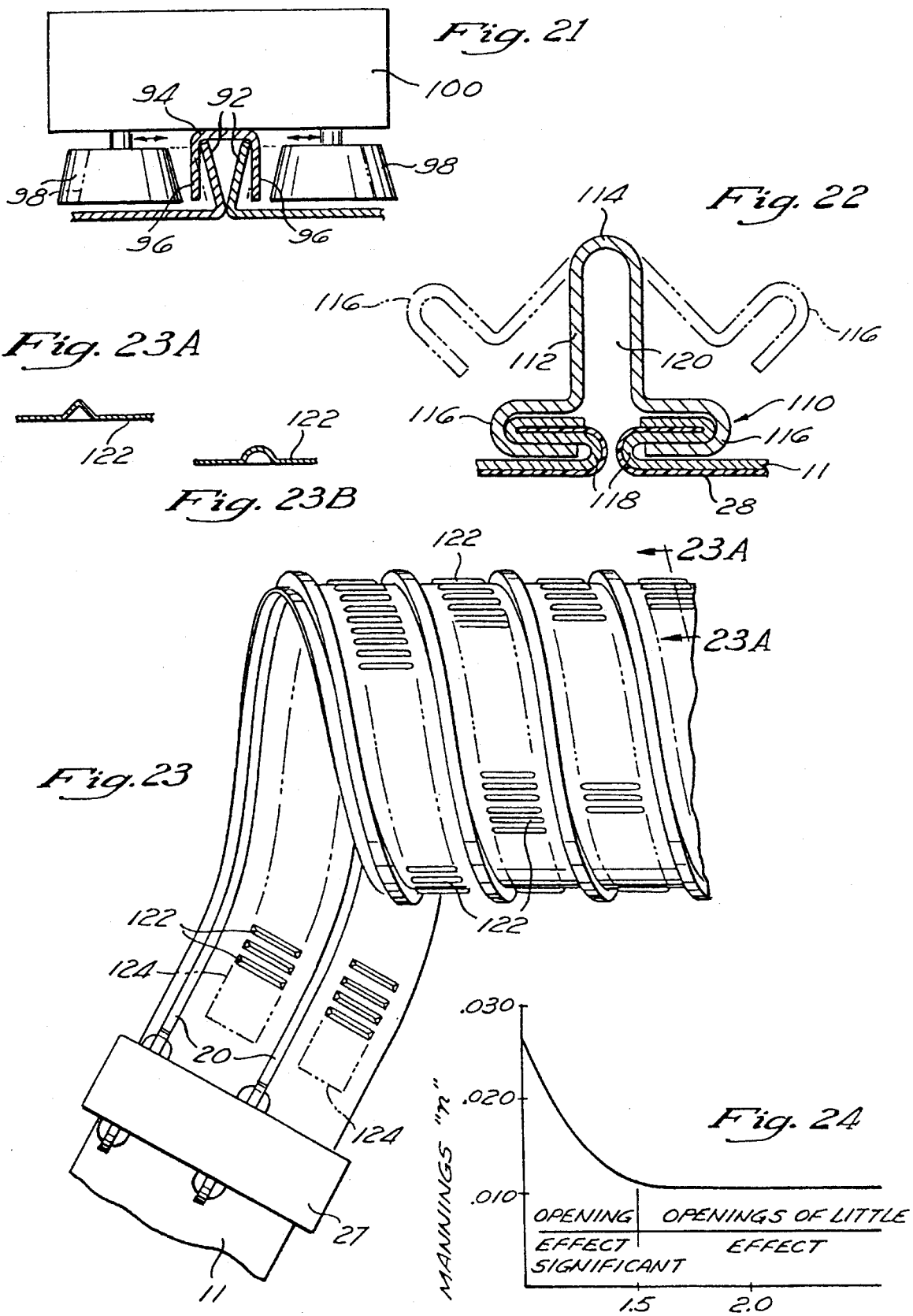

HYDRAULICALLY EFFICIENT RIBBED PIPE HAVING OPENINGS

BACKGROUND OF THE INVENTION

The present invention relates-to pipe for use in sewers, storm drains, penstocks, culverts and other low head applications, and more particularly to a hydraulically efficient pipe which is also adapted for use with an interior inert protective lining without the need for additional securement means.

Corrugated metal pipe of both the annular and helical type is currently widely used for culverts and other similar pipelines due to its relatively low cost and light weight which facilitates handling. However, its corrugated construction and susceptibility to corrosion have heretofore greatly restricted its use in storm drains and prevented altogether the use of corrugated metal pipe in sanitary applications such as sewer installations. Consequently, industry has been forced to turn to the considerably heavier and more expensive concrete pipe for such pipelines.

The cylindrical wall of corrugated pipe is sinusoidal in cross-section giving the pipe a rough interior surface which has a direct adverse effect on fluid flow therethrough. This effect is clearly illustrated by Manning's Equation:

$$V = \frac{1.486}{n} R^{2/3} S^{1/2}$$

wherein "n" represents the coefficient of roughness, V represents the velocity of flow in feet per second, the hydraulic radius and S the slope or grade. Smooth concrete pipe has a coefficient of roughness of about 0.013 as opposed to about 0.027 for corrugated pipe having 3×1.0 inch corrugations and 0.024 for pipe having corrugations of 2.66×0.5 inch. Due to this inverse effect on the velocity of fluid flow, the use of corrugated pipe requires a larger diameter for a given flow than pipe with a relatively smooth interior such as concrete pipe and the larger the pipe (generally necessitating larger corrugations or heavier wall thickness for additional structural strength), the greater the difference. It would therefore be desirable to provide a type of pipe having the cost and weight advantages of corrugated steel pipe, but with improved hydraulic efficiency.

In addition to having poor fluid flow characteristics, metal corrugated pipe is highly susceptible to corrosion from the material flowing therethrough. Accordingly, the steel from which such pipe is made is almost always galvanized. In some cases an inert protective coating is also applied to the interior of the pipe in an effort to provide additional protection against corrosion. However, such coatings have also proved ineffective in many installations as the turbulent fluid flow through such pipe caused by its rough interior surface causes debris such as rocks and the like to be dragged or rolled along the sinusoidal corrugations abrading these protective coatings resulting in erosion and corrosion and pipe damage. In an effort to prevent such erosion and corrosion, the interior of corrugated steel pipe has been lined with concrete in the hopes that a thicker lining would be more abrasion resistant and thereby resist deterioration and corrosion. In addition, the smooth interior surface presented by the concrete would improve the hydraulic efficiency of the pipe. However, there is no suitable means for anchoring the concrete to the interior wall of corrugated pipe and pieces of the concrete lining inevitably begin to fall therefrom. This destroys the improved flow characteristics of the pipe and when combined with the continual abrading action occurring therein, quickly destroys the protective concrete layer as well. If a concrete liner or other suitable material could be adequately anchored to the pipe wall, the resulting combination would not only be highly suited for use in storm drains but would be markedly improved over the conventional concrete pipe due to reduced costs and weight.

In addition to accelerating corrosion by causing abrasion of the metal's protective coatings, a corrugated surface also causes a build-up or collection of foreign material on the corrugations. Such a build-up also leads to corrosion and, in fact, prevents such pipe from being used in sewers or sanitary applications where bacterial build-up can occur. In such uses it is necessary to employ pipe having a relatively smooth bore, not solely from a hydraulic standpoint, but to facilitate cleaning of the interior of the pipe and prevent the breeding of bacteria. Here again, industry has had to turn to concrete pipe despite the fact that concrete is highly susceptible to attack by sulfuric acid which is created by the hydrogen sulfide generated in sewer lines. For sewer installations as well as storm drains, it would be highly desirable to be able to utilize the less expensive and lighter steel pipe with an inert interior protective lining. While concrete would not be preferable for such applications, as above indicated, an inert lining such as one constructed of polymer materials such as polyethylene or PVC, which would resist the attack of sulfuric acid as well as other forms of corrosion, would be ideal. In addition, such a liner should be sufficiently thick to provide protection against abrasion. Because the conventional interior linings of corrugated pipe are so susceptible to abrasion and corrosion and a thicker and more abrasive resistant inert lining such as one constructed of concrete or an inert polymer material cannot be effectively anchored to the corrugated pipe walls, corrugated steel pipe has heretofore been unacceptable for use in sanitary applications such as sewer drains.

Just as corrugated metal pipe suffers from interior difficulties, a problem also exists in adequately protecting its external surface against corrosion. Pipelines are generally laid beneath the ground and again steel is quite vulnerable to its environment. While plastic and other protective coatings can be applied to the pipe's exterior, a single holiday in the coating opens the door to damaging corrosion. The generally rough manner in which pipe lengths are handled in the yard, during loading and unloading and on the job, substantially reduces the effectiveness of these coatings and consequently the advantages of corrugated steel pipe as well.

In view of the shortcomings of corrugated metal pipe and concrete pipe, it would be highly desirable to provide a pipe having structural and cost characteristics similar to those of corrugated metal pipe, but with improved flow characteristics and capable of being readily rendered corrosive resistant, both interiorly and exteriorly, and, for use in sanitary applications, easily provided with a continuously smooth interior liner. Such pipe could be more economically employed in those applications in which corrugated steel pipe is presently being used and also would be ideally suited for sewers, storm drains and other areas heretofore outside the field of use of metal corrugated pipe.

SUMMARY OF THE INVENTION

Briefly, the invention comprises a pipe and methods of manufacturing pipe which is hydraulically efficient and adapted for use with interior and exterior protective coatings. The pipe has a channeled wall defining a hydraulically smooth interior surface and a plurality of either annular or helical outwardly projecting structural supporting ribs extending about and along the length of the pipe wall. The channels formed in the pipe wall interiorly of the supporting ribs are opened along the interior surface of the pipe to define an anchor throughout the length of the pipe for securing thereto a smooth interior lining of a suitable corrosion resistant protective material.

It is the principal object of the present invention to provide an economical and hydraulically efficient pipe which is readily susceptible of being rendered corrosion resistant.

It is another object of the present invention to provide a metal ribbed pipe having improved fluid flow characteristics over those exhibited by corrugated metal pipe.

It is a further object of the present invention to provide a metal ribbed pipe which includes means integral therewith for anchoring a smooth liner of inert material to the interior of the pipe wall.

It is still a further object of the present invention to provide a metal ribbed pipe having an abrasion resistant interior wall surface.

It is yet another object of the present invention to provide a metal ribbed pipe which resists damage to external corrosion protective coatings applied thereto.

These and other objects and advantages of the present invention will become apparent from the following detailed description taken in conjunction with the accompanying drawings.

IN THE DRAWINGS

FIG. 3 is an enlarged partial sectional view of a length of pipe constructed in accordance with the present invention and having tapered ribs for locking in place an interior liner for use in sanitary applications.

FIGS. 4(a) and 4(b) are sectional views of the pipe of the present invention having concrete and polymer liners secured thereto respectively.

FIG. 5 illustrates the forming of a length of pipe with an interior liner therein.

FIG. 6 is a series of sectional views illustrating different rib configurations for use in pipe constructed in accordance with the present invention.

Figure 1:
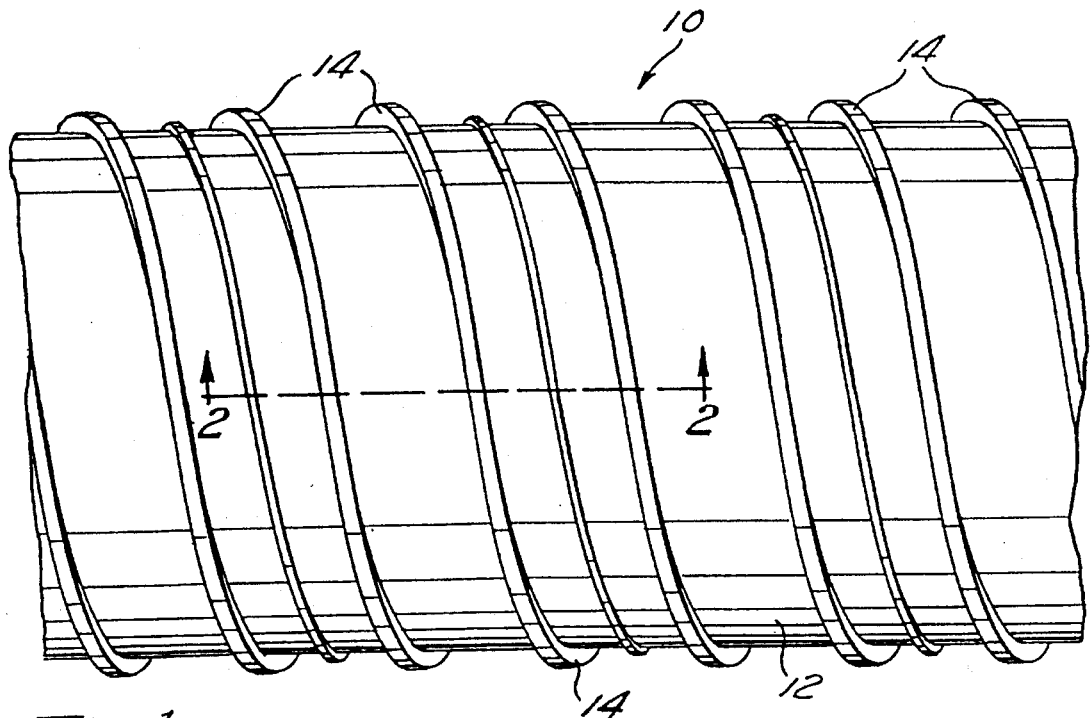
FIG. 1 is a perspective view of a length of pipe constructed according to the present invention.
Figure 2:
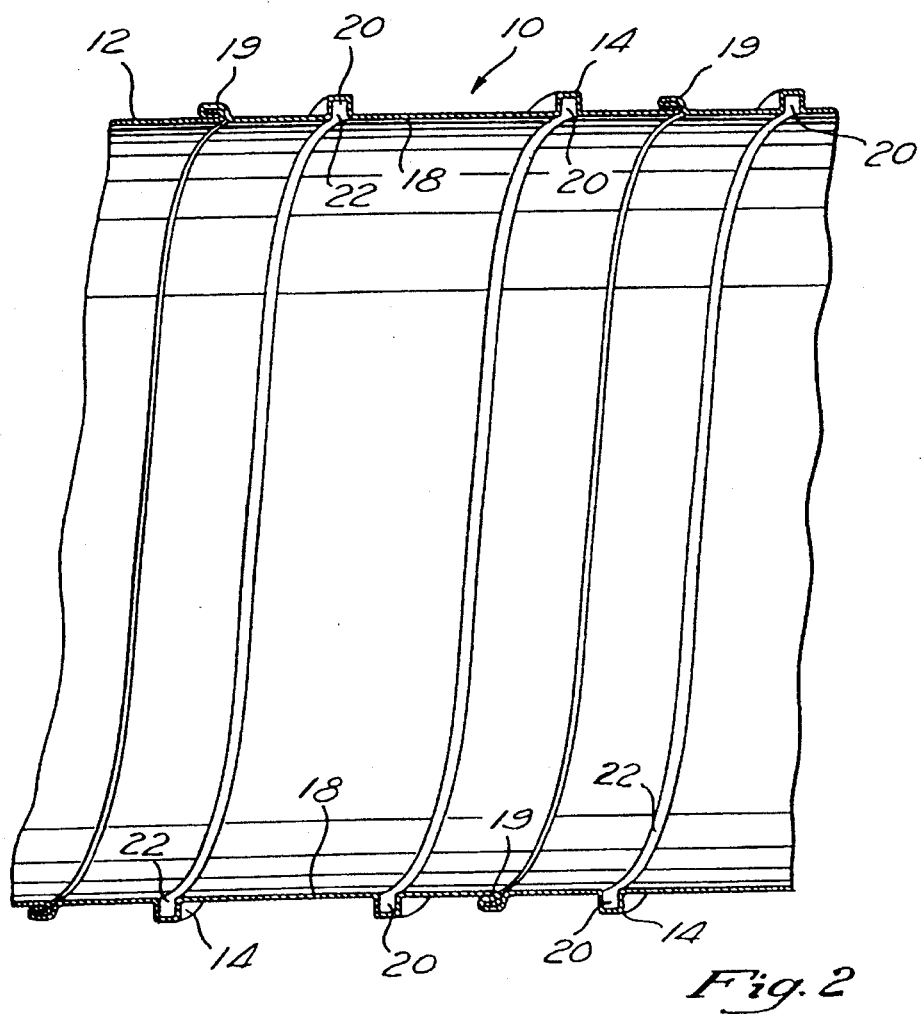
FIG. 2 is a sectional view taken along line 2—2 in FIG. 1.
Figure 6A:
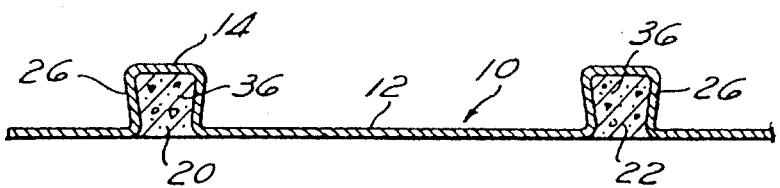
Figure 6B:
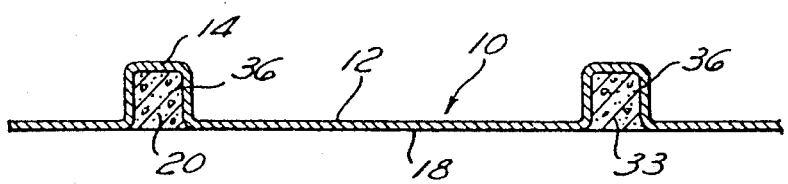
Figure 6C:
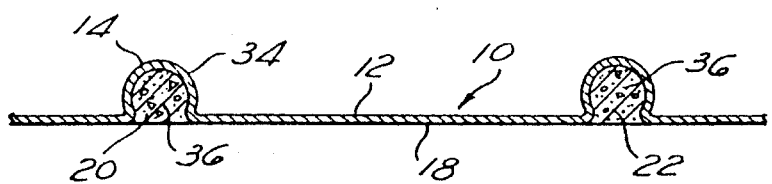
Figure 6D:
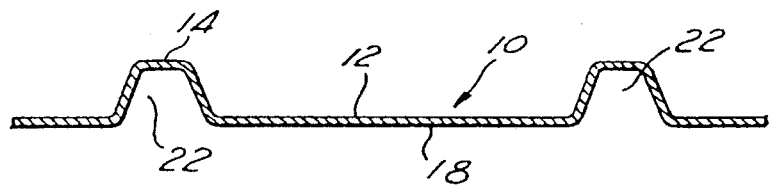
Figure 7:
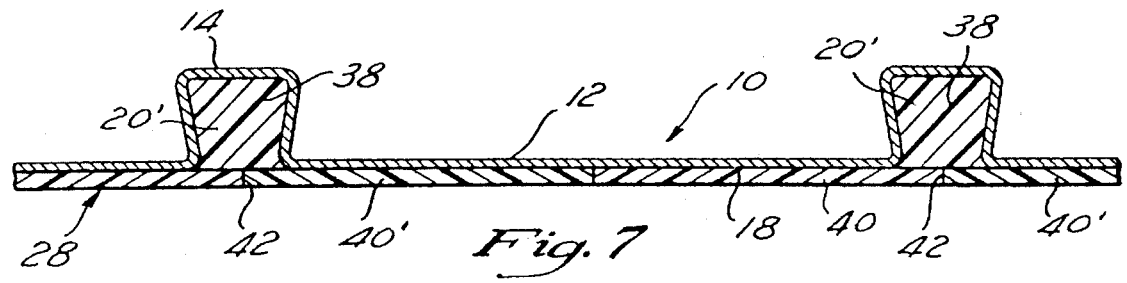

FIG. 7 is an enlarged sectional view of a portion of a length of pipe constructed in accordance with the present invention having a smooth interior liner comprised of abutting. sheets of inert plastic material anchored to a filler held within the channels in the pipe wall.

Figure 8:
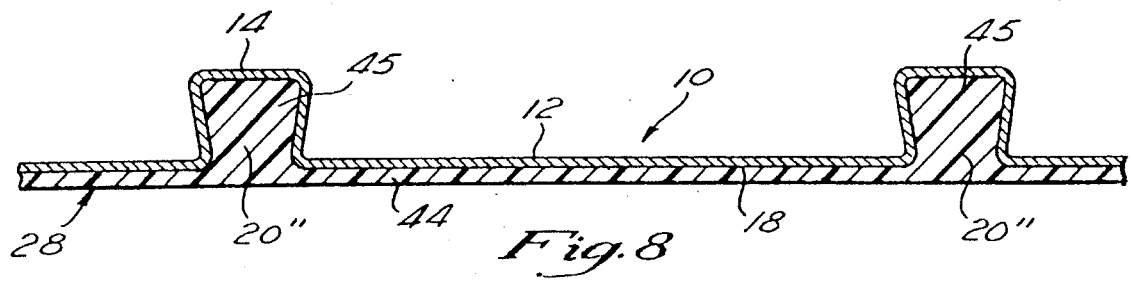

FIG. 8 is an enlarged partial sectional view of a length of pipe constructed in accordance with the present invention illustrating a ribbed inner lining tube of inert polymer material anchored within the channels of the pipe wall.

Figure 9:
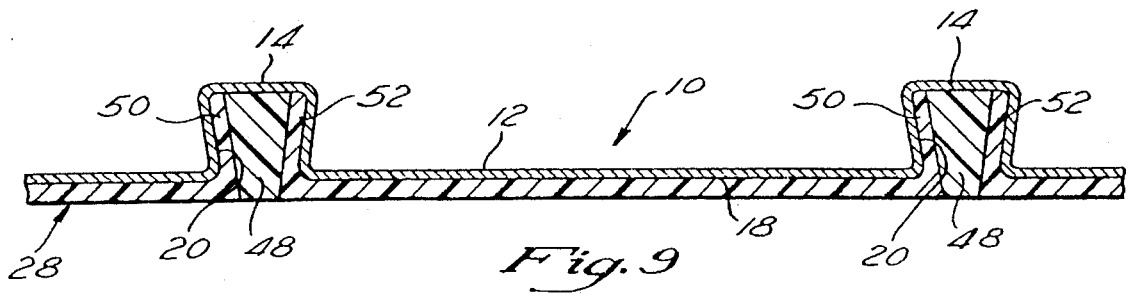

FIG. 9 illustrates another method for securing a polymer liner to the interior pipe wall, FIG. 10 is an enlarged sectional view of a length of pipe constructed in accordance with the present invention utilizing the lock seam to anchor a smooth interior sheet of polymer materials thereto, FIG. 11 illustrates an alternate embodiment of the present invention utilizing a perpendicularly disposed lock seam as a structural supporting rib and an anchor for an interior liner, FIG. 12 is an enlarged partial sectional view of a length of pipe constructed in accordance with the present invention provided with protective caps for preventing damage to an external corrosion protective coating, FIG. 13 is an enlarged sectional view of a length of pipe constructed in accordance with the present invention utilizing expanded metal between the projecting supporting ribs.

FIG. 14 illustrates a method of forming pipe according to the present invention wherein an interior liner is secured to the pipe by the lock seam.

Figure 15:
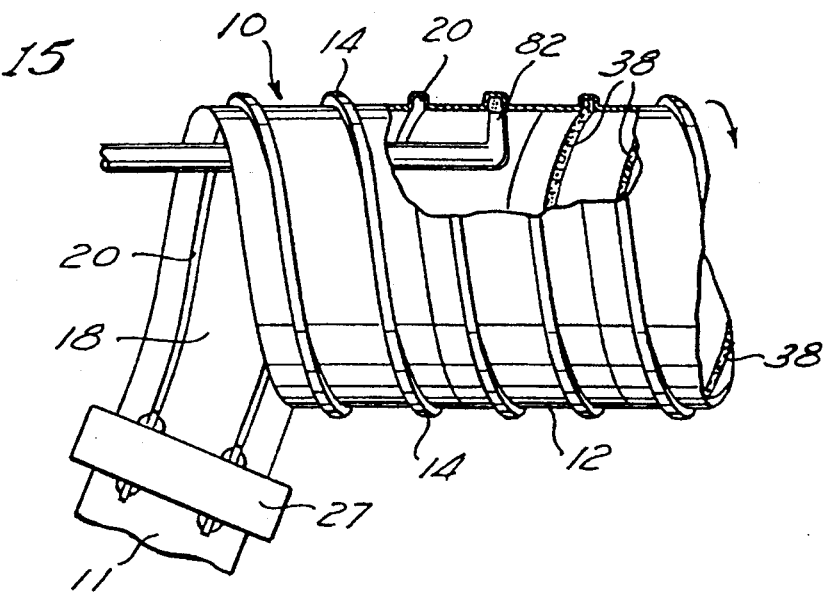

FIG. 15 illustrates the forming of pipe of the present invention wherein reinforcing material is extruded into the formed channels defined by the ribs of the pipe.

Figure 16:
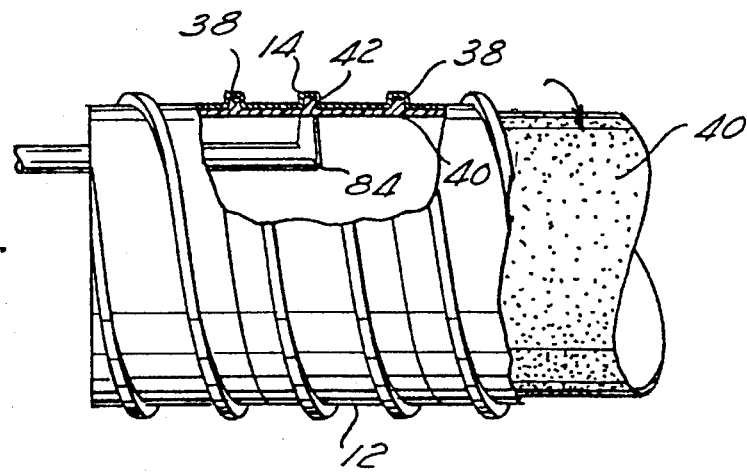

FIG. 16 illustrates the step of securing an interior liner to reinforcing material disposed in the channel defined by the ribs of the pipe whereby the liner is held secured to the pipe.

Figure 17:
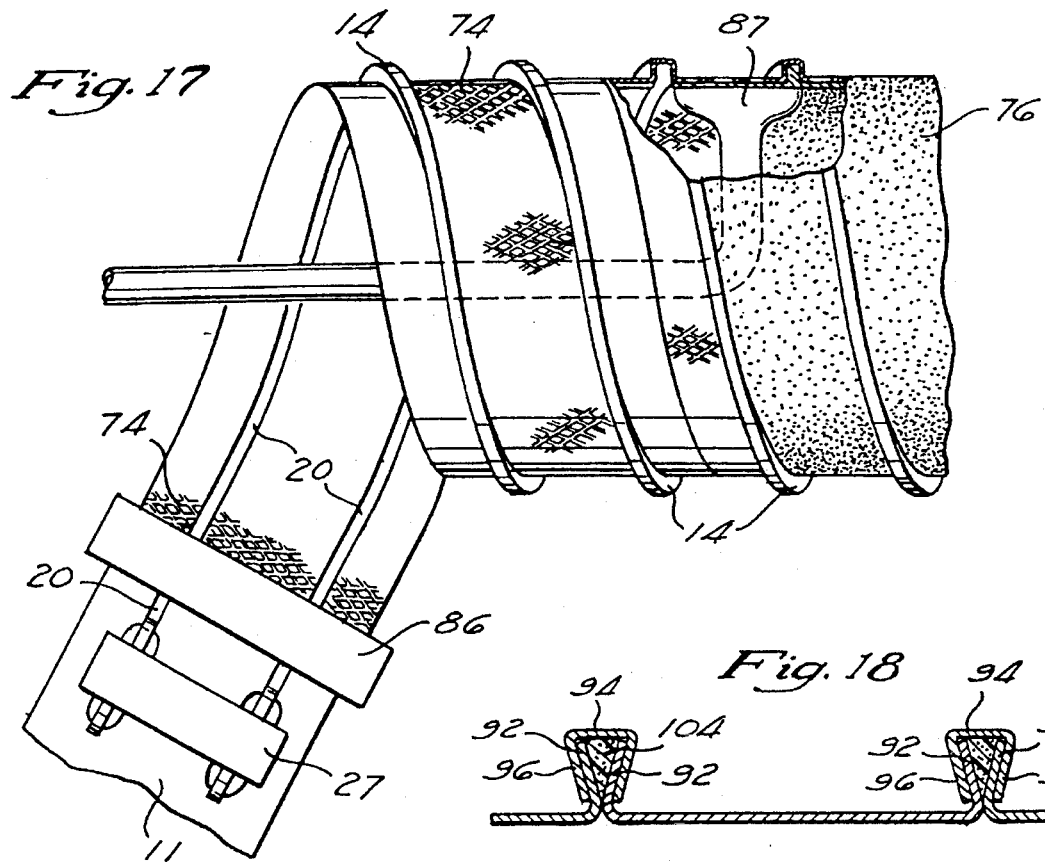
Figure 18:
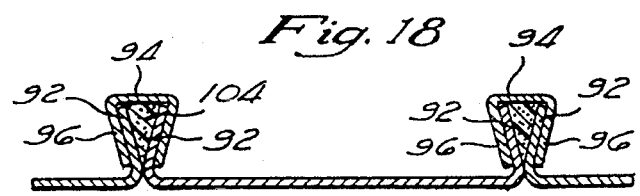

FIG. 17 illustrates the process of manufacturing pipe according to the present invention wherein the metal between the ribs is expanded and the liner secured to the expanded metal.

FIGS. 18–21 illustrate another embodiment of the present invention and the method of manufacturing that embodiment.

FIG. 22 is a sectional view of yet another rib configuration for use in pipe constructed in accordance with the present invention.

FIG. 23 illustrates a method of providing the pipe of the present invention with longitudinal straightening ribs and FIGS. 23(A) and (B) illustrates two cross-sectional configurations of the straightening ribs.

FIG. 24 is a graph illustrating the relationship between the ratio of the spacing between adjacent ribs in the pipe of the present invention and the width of the channel openings to the coefficient of roughness (n) in Manning's Equation.

Figure 25:
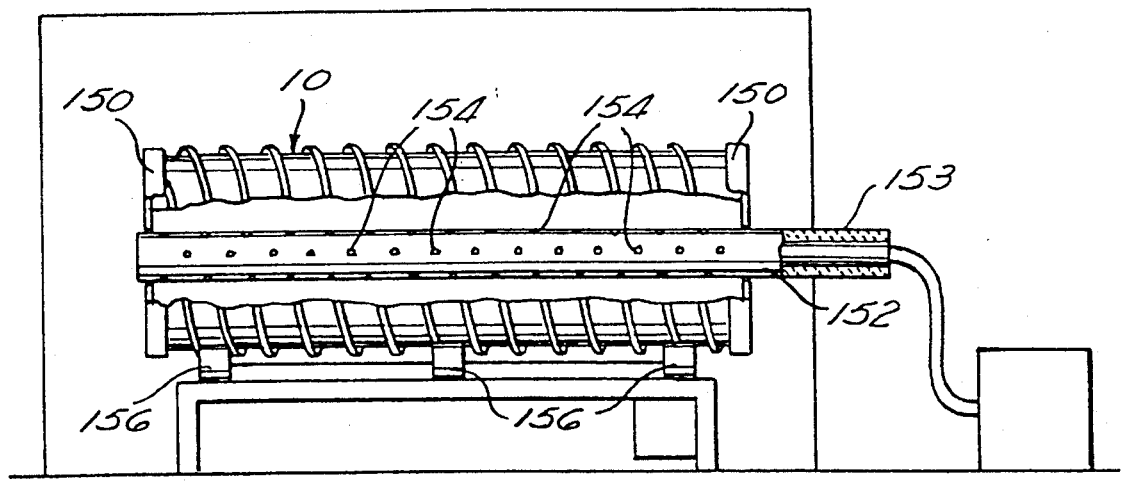

FIG. 25 illustrates the forming of an interior liner within a length of pipe of the present invention by rotational casting.

Referring now in detail to the drawings, the pipe of the present invention is preferably constructed from a sheet of steel 11 in varying gauges, although other materials could be used, and is provided with a channeled cylindrical wall 12 defining a plurality of outwardly projecting structural ribs 14 which are preferably uniformly spaced about and along the length of the pipe. These ribs can either be annularly or helically disposed in the pipe wall although as with conventional corrugated metal pipe, the helical construction is preferred to facilitate pipe fabrication. While only helically disposed ribs are illustrated in the drawings, it is to be understood that annular ribs could also be employed.

To improve the hydraulic efficiency of pipe 10 over that of corrugated pipe, the ribs do not cause any inward deformation of the pipe wall thereby providing the pipe with a smooth interior surface 18 of constant radius interrupted solely by flat lock seam 19 which are used to form the pipe from rolls of sheeting and the spaced channels 20 which formed interiorly of the ribs 14. As the velocity of fluid flow through pipe 10 varies inversely with the roughness factor (n in Manning's Equation above) which is affected by the ratio of the spacing between channels 20 to the width of channel opening (see FIG. 24), this velocity is dependent on this ratio. Within the parameters outlined herein, however, such variance should be relatively slight and the velocity loss due to the small influence exerted on the fluid flow through the pipe by the open-spaced channels therethrough are, as noted above, significantly less than that found in similarly sized corrugated pipe. This difference results from the rough sidewalls of the corrugated pipe and the turbulence created thereby as contrasted with the hydraulically smooth interior surface of pipe 10. Tests conducted on pipe constructed in accordance with the present invention have determined that with 24 inch diameter pipe having channels 0.75 inches in height by 0.75 inches in width and 12 inch spacings between channels, the roughness factor is about 0.010 to 0.011. Accordingly, the flow characteristics of such pipe are about the same as those of smooth pipe, superior to concrete pipe and markedly superior to corrugated steel pipe. Due to its improved hydraulic efficiency, pipe 10 is capable of handling various flow requirements with smaller diameter pipe than is corrugated pipe thereby representing a significant economic savings.

As the openings 22 of the channels in the pipe wall are reduced in size, the effect of the channels 20 on the fluid flow through the pipe is correspondingly reduced and the flow velocity is slightly increased. This is illustrated in FIG. 24 wherein the ratio of the spacing between parallel channels to the width of the channel openings is plotted against Manning's coefficient of roughness (n). As can be seen therein, this ratio has a critical value beyond which the opening has little effect on flow resistence. However, too large a spacing adversely affects the strength of the pipe. Tests conducted on pipe 10 indicate that with channel openings 0.5 to 1.5 inches wide by 0.5 to 1.5 inches in depth, spaced 6 to 12 inches apart provide excellent structural flow characteristics. Tests also demonstrated that spacings of about 11 to 12 inches provide excellent hydraulic characteristics. The lower limit on the spacing between the ribs has yet to be determined. The optimal rib configuration to achieve the desired strength and hydraulic characteristics is believed to be 0.75 inches wide by 0.75 to 1.0 inches in depth with spacings of 11–12 inches between the ribs.

Further, various fill heights for both trench and embankment installations were calculated for variations in the dimensions of the channels, changes in the pitch or spacing between the channels, changes in pipe diameter and the gauge or thickness of the pipe. These fill heights were calculated according to ASTM Standard A796 and are set forth below. These tables show that with a 0.75 inch wide by 0.75 inch deep rib at a 12 inch pitch (spacing), sheets can be used in 18 and 16 gauge thickness for pipe up to 48 and 60 inches in diameter respectively. With a 0.75 inch wide by 1.0 inch deep rib at an 11 to 12 inch pitch, sheets can be used in 18 to 12 gauge thickness for pipe as large as 72 to 120 inches in diameter, respectively. These maximum diameters are for trench installations; maximum diameters for embankment conditions are somewhat less.

TABLE I

Maximum Fill Height (Feet) for Spiral-Rib Pipe
.75 by .75 Inch Ribs at 12-Inch Pitch

| Pipe Diameter, inches | 18 Gauge | 16 Gauge |
|---|---|---|
| 24 | 31 | 44 |
| 30 | 25 | 35 |
| 36 | 21 | 30 |
| 42 | 18 | 25 |
| 48 | (16) | 22 |
| 54 | | (20) |
| 60 | | (18) |

*See footnote on page 14

TABLE II

Maximum Fill Height (Feet) for Spiral-Rib Pipe
.75 by-1-Inch Ribs at 12 Inch Pitch

| Pipe Diameter, inches | 18 Gauge | 16 Gauge | 14 Gauge | 12 Gauge |
|---|---|---|---|---|
| 24 | 35 | 48 | 68 | 114 |
| 30 | 28 | 39 | 54 | 91 |
| 36 | 23 | 32 | 45 | 76 |
| 42 | 20 | 28 | 39 | 65 |
| 48 | 17 | 24 | 34 | 57 |
| 54 | 15 | 22 | 30 | 51 |
| 60 | (14) | 19 | 27 | 46 |
| 66 | (13) | (18) | 25 | 41 |
| 72 | (12) | (16) | 23 | 38 |
| 78 | | (15) | (21) | 35 |
| 84 | | (14) | (19) | 33 |
| 90 | | | (18) | (30) |
| 96 | | | (17) | (28) |
| 102 | | | | (27) |
| 108 | | | | (25) |
| 114 | | | | (24) |

*See footnote on page 14

TABLE III

Maximum Fill Height (Feet) for Spiral-Rib Pipe
.75 by-1-Inch Ribs at 11-Inch Pitch

| Pipe Diameter, inches | 18 Gauge | 16 Gauge | 14 Gauge | 12 Gauge |
|---|---|---|---|---|
| 24 | 38 | 53 | 73 | 123 |
| 30 | 30 | 42 | 59 | 99 |
| 36 | 25 | 35 | 49 | 82 |
| 42 | 22 | 30 | 42 | 70 |
| 48 | 19 | 26 | 37 | 62 |
| 54 | 17 | 23 | 33 | 55 |
| 60 | (15) | 21 | 29 | 49 |
| 66 | (14) | (19) | 27 | 45 |
| 72 | (13) | (18) | 24 | 41 |
| 78 | | (16) | (23) | 38 |
| | | (15) | (21) | 35 |
| | | | (20) | 33 |
| | | | (18) | (31) |
| | | | | (29) |
| | | | | (27) |
| | | | | (26) |
| | | | | (25) |

*(1) Fill heights in parentheses are for trench installations only; others are for either embankment or trench installations.
(2) Based on H-20 loading, minimum fill height is ¼ of diameter for pipe over 48 inches in diameter and 1 foot for all other diameters.

Testing has shown that these two profiles appear to be essentially optimal over the indicated range of diameters.

Other profiles examined would not offer significant weight savings for pipe designed for more moderate fill heights. However, other profiles could be considered for certain larger diameters. Referring to Table 1, a deeper rib would increase the pipe stiffness and extent the maximum diameters for which 18 and 16 gauge sheets could be used, but the maximum fill heights would generally be reduced because the wall area would not increase significantly. The diameters for these sheets gauges could be increased effectively by reducing the pitch to 6 inches.

While the above study was based on ribs having vertical sidewalls, slightly tapering the walls to provide tapered channels 20' as illustrated in FIG. 3 should not appreciably affect the structural support afforded by the ribs and slightly reduces the channel openings 22' to further improve the hydraulic efficiency of the pipe. In addition, narrowing the channel openings forms an anchoring area defined by the tapered channels 20' for securing an interior or inner liner 28 to the inner pipe wall without the need for additional attachment means. A narrowing of the ribs such that the open ends of the channels formed thereby are about one-half or less than the transverse dimension of the outer closed ends of the ribs is ideal for such purposes. By way of example, tapering the channels from 0.75 inches at the outer closed end 0.375 inches at the open end thereof provides excellent securement of the liner. When the pipe 10 is to be used for storm drain applications, a concrete liner if desired would be suitable. The liner could either extend about the entire interior of the pipe or solely about the pipe's invert or lower surface which is continually subjected to fluid flow. A concrete liner is illustrated in FIG. 4(a). In sanitary or sewer applications an inner lining of inert material such as polyethylene or PVC is preferred due to the effect of sulfuric acid on concrete. Such a liner is shown in FIG. 4(b). It would be noted that such an anchor is of particular significance for securing a liner of inert material such as polyethylene due to the previous inability of the industry to satisfactorily adhere such a liner to a pipe without additional attachment means which are often highly susceptible to corrosion and deterioration. By reducing the size of the channel openings 22' the liner 28 which extends into the channels openings 22' the liner 28 which extends into the channels is held in place by the necked down channel throughout the length of the pipe 10. In constructing pipe 10, a concrete liner would preferably be applied to the interior of the pipe after fabrication of the pipe and would be firmly held to the pipe wall upon hardening, whereas a polymer liner might more easily be applied to the interior of the pipe during, fabrication by means of rotational casting illustrated in FIG. 25 (to be discussed later herein) or by a suitable. extruding head 30 extending into the interior of the pipe through the forming end 32 as suggested in FIG. 5. FIG. 5 also illustrates the sheet of steel 11 first being directed through a channel former 27 which forms ribs 14 and then being rolled into a helical configuration just prior to the application of the liner 28.

FIG. 6 illustrates some of the different modifications of the rib shapes which could be employed with pipe 10 and provide the desired hydraulic efficiency and structural strength as well as the used rib fillers for additional strength. FIG. 6(a) illustrates the squared configuration with tapered rib walls for use in sanitary applications while FIG. 6(b) shows the squared wall design for use in storm drain applications. FIG. 6(c) illustrates a rounded rib configuration 34 which, like that illustrated in FIG. 6(a), provides a bottleneck anchor for an interior liner. FIG. 6(d) illustrates a rib defining an outwardly tapered channel. While such a design has a somewhat lower hydraulic efficiency due to the enlarged channel opening, it employs less material than the inwardly tapered or straight wall configuration and would therefore be even more economical. In addition, the outwardly tapered channel still provides a pipe with a hydraulic efficiency superior to that found in corrugated steel pipe. Accordingly, such a configuration would be well-suited for certain culvert and other installations not requiring the use of a durable interior liner but in which some improved hydraulic efficiency would be desired.

FIGS. 6(a-c) also illustrate the use of a structural filler 36 such as concrete which can be placed within the channels during or following the pipe manufacturing stage to provide a smooth interior surface and additional structural strength for the pipe 10 without the need for additional steel thereby resulting in a substantial economic savings. The filler, of course, is anchored within the channel in the same manner as the interior lining 28. It is to be understood that fillers other than concrete could be employed for such purpose.

As described above, an inert polymer lining or other interior liners can be anchored to the interior pipe wall by means of the tapered channels 20' to protect the interior of the pipe and provide a continuously smooth interior surface for optimal hydraulic efficiency. While FIG. 4(b) presently represents the preferred embodiment of the invention for use in sanitary applications,. FIGS. 7 and 8 illustrate alternative means for securing a polyethylene or other inert polymer interior liner 28 to the pipe wall. FIG. 7 illustrates pipe 10 having a polyethlyene or other suitable polymer filler 38 disposed within channels 20' and a plurality of abutting sheets of plastic liner rolled into tubes 40 and 40' and inserted into the pipe 10 in abutting relationship to define the interior liner 28. The tubes 40 and 40' are then secured together and the filler 38 within the channels 20' by means of heat, solvent or other suitable weld 42 thereby anchoring the interior liner defined by the abutting tubes to the interior pipe wall. This method of securing the interior liner to the pipe could also be employed with a liner comprised of a single continuous tube of inert plastic material which extends the length of the pipe which would be ideally suited for use in shorter pipe lengths.

An alternate embodiment, not shown, of securing a liner to an anchor held within tapered channels 20, employs the use of a cord of material which is held within the channels and which has elongated fibers or strands of material extending radially therefrom into the interior of the pipe 10. The liner is then applied to the interior of the pipe about the fibers or strands such that they become embedded in the liner and thus hold the liner in place against the interior pipe wall.

FIG. 8 illustrates another method for securing a continuous tube inserted to the interior pipe wall. As seen therein, the plastic tube 44 is provided with a plurality of projecting ribs 45 which are pressed into the channels 20" and held therein by a pressure fit thereby anchoring the tube liner in place. This embodiment differs from that shown in FIG. 4(b) in that the channels 20" are less tapered than channels 20' to accommodate the press fit. Further, the embodiment illustrated in FIG. 4(b) contemplates molding or extruding the liner within the tapered channels 20'.

FIG. 9 illustrates another method for securing a plastic liner 28 to the interior pipe wall wherein the liner is spirally formed into the pipe such that the location of the seams thereof are disposed over the channels 20 in the pipe. The ends 50 and 52 of the formed plastic liner are depressed into the channels and are held therein by the force of the plastic filler or plug 48 pressing said ends 50 and 52 against the sidewalls of the rib. If necessary, a solvent or heat weld could be applied at the junctures of the formed liner 46 and the filler or plug 48.

FIG. 10 illustrates another use of the invention wherein a flat lock seam 54 of the pipe, which extends helically about and along the pipe between the projecting ribs and which is employed to form the pipe length from a sheet of flat metal, is also employed to anchor an interior plastic liner 28 to the interior pipe wall 12. Lock seam 54 differs from the conventional lock seam used in the manufacture of spiral pipe in that the seam is pressed flat to maintain a flat surface between the projecting ribs and avoid any adverse effects on the fluid flow characteristics of the pipe. A sheet of polymer material 56 having a width the same as that of the metal sheeting from which the pipe is fabricated after the ribs have been formed therein is spirally fed into the pipe during the fabrication thereof and the lateral ends 58 and 60 of the sheet are pressed into the forming lock seam and held therein by the resulting pressure fit. In this method of construction the sheet of polymer material has a width the same as that of the metal sheeting from which the pipe is fabricated with the ribs formed therein. In this manner the lateral edges of the liner are aligned with the metal sheeting and upon joining these edges together in a lock,seam, the pipe 10 is provided with a smoother interior liner interrupted solely by the indentations 62 under the spiralling lock seam. The smooth, flat portion of the pipe wall between the channels 20 therein provides support for the inner liner and prevents the liner from being pressed into a corrugated configuration under the force of the flow therethrough which otherwise would result were such a locking process to be employed with corrugated steel pipe.

A variation of the above implementation of the lock seam of the pipe as an anchor for an interior liner is illustrated in FIG. 11. As shown therein, the lock seam 64 is raised to a perpendicular disposition with respect to the longitudinal axis of the pipe 12 so that the seam itself provides the necessary strength for the pipe and the ribs and open channels 20 defined thereby have been eliminated. This embodiment is suited for smaller diameter pipe (about 6 to 18 inches in diameter) where less structural supporting strength is needed. By perpendicularly disposing the lock seam with respect to the pipe, the lock seam itself defines a supporting rib which acts both to support the pipe and anchor an interior liner in the manner just described.

In addition to greatly increasing the hydraulic efficiency of the pipe 10 and providing an anchor for securing a protective liner to the interior pipe wall, the protruding structural ribs 14 can also serve to protect the pipe's exterior. FIG. 12 illustrates a pipe 10 provided with an external corrosion-resistant coating 68 which is shown in FIG. 5 being extruded Unto the pipe through forming head 66. To protect this coating, a corrosion resistant durable metal cap 70 is secured about the extended end 72 of the rib and affixed thereto by a suitable adhesive. As the rib spacing on pipe 10 is rarely greater than 12 inches (see Table 3), a plurality of such caps disposed over the protruding ribs should provide excellent protection for the relatively fragile coating 68 as pipe lengths are knocked together in the yard, during the transport and on the job. The interior protective liner 28 illustrated in FIG. 12 is of integral construction such that a portion 28' thereof projects into and is anchored within the channel formed by ribs 14, The method by which liner 28 could be applied to the pipe wall is illustrated in FIG. 5, Another embodiment of the present invention is illustrated in FIG. 13. This embodiment differs from the preferred embodiment in that the portion 74 of the pipe wall extending between the parallel ribs 14 is formed of expanded metal. The process for forming such pipe is illustrated in FIG. 17, As seen therein, the metal sheet 11 is passed through a channel former 27 for forming channels 20 and projecting ribs 14, The sheet then is passed through an expander 86 which slits the metal in portion 16 on either side of the channels and expands the metal laterally and vertically to define what is commonly termed expanded metal. In such an embodiment, excess material for the formation of the ribs and lock seams becomes available throughout the expansion of portion 16 and the expanded portion 16 which extends in both vertical directions from an otherwise flat surface defines a key which accepts and itself becomes an anchor for a smooth protective coating 76. This coating extends both internally and exteriorly of the pipe wall and thereby protects the pipe from both internal and exterior corrosion. Such a coating could be extruded onto a limited area of the pipe either during or after fabrication thereof and as the pipe was rotated and linearly moved with respect to the extruding head, an even coating would be applied to the forming or formed pipe which would form both an interior and exterior lining of unitary construction. Such a lining could either be of a polymer material, portland cement mortar for storm drain uses, a polymer concrete or other inert material suitable for providing the desired protective lining. FIG. 17 illustrates the coating 76 being applied by extruding head 87.

FIG. 14 illustrates the forming of pipe 10 wherein the liner 28 is disposed over the sheet of steel 11 with channels 20 formed therein such that the lateral edges 28" of the liner are disposed over and adjacent the lateral edges 11' of the steel sheet 11. So positioned, the sheet and liner are rolled into a helical configuration defining a length of pipe with a plurality of outwardly projecting ribs 14, an interior liner 28 and a helically extending seam 53. The seam 53 is defined by the adjacent lateral edges 28" and 11' of the liner and sheet of steel. These edges are then pressed together to form the lock seam 54 illustrated in FIG. 10, thereby locking and maintaining the interior liner 28 in place.

FIG. 15 illustrates the forming of pipe 10 wherein the sheet of steel 11 is first directed through the channel former 27 for forming the channels 20 and projecting ribs 14. The formed sheet is then rolled into a helical configuration to define a length of pipe having a plurality of outwardly projecting ribs 14 and a corresponding plurality of helically disposed channels 20 on the interior of the pipe. A reinforcing material 38, preferably a polymer filler, is then placed with the channels by an extruding or any other suitable means generally designated 82. A polymer tube 40 defining an interior liner is then placed within the pipe and secured to the filler material 38 held within the pipe channels 20 by means of a heat, solvent or other suitable weld 42 which could be applied by welding means 84. As described above, and as illustrated in FIGS. 7 and 16, either a single or a plurality of liner tubes 40 can be disposed within the pipe with the abutting ends of the tubes being secured together and to the filler material 38 within the channels 20 by the same weld. The use of a plurality of such tubes, of course, is preferable when forming longer pipe lengths.

Figure 19:
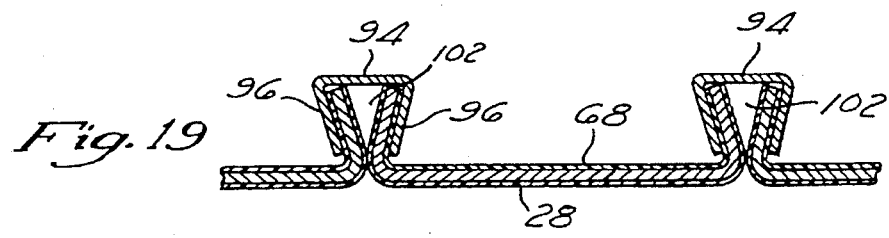
Figure 20:
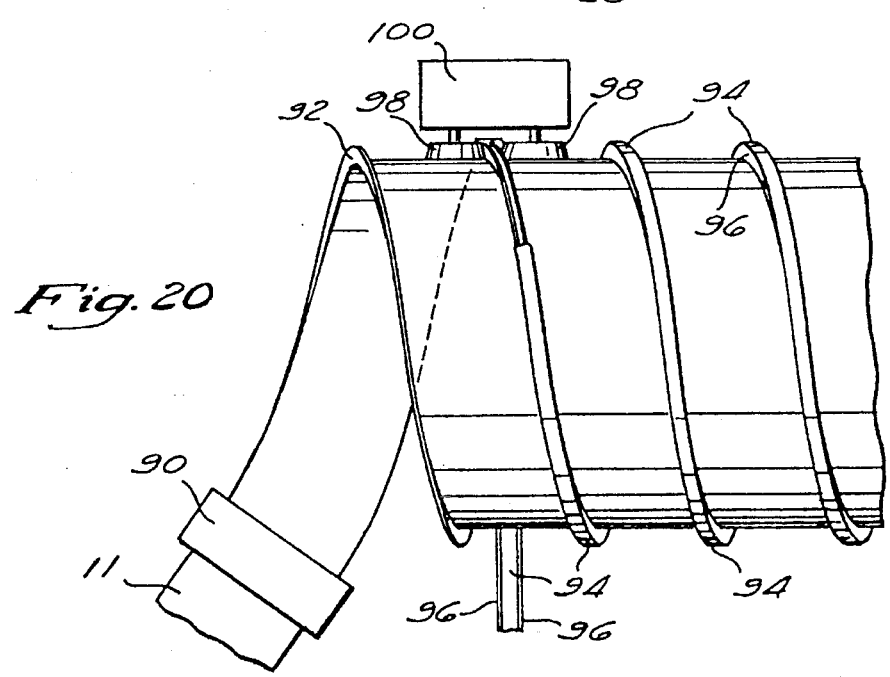

FIGS. 18–21 illustrate yet another embodiment of the present invention and the method for making the same. In this embodiment, a sheet of steel 11 is directed through a flanging device 90 which bends the lateral edges of the sheet slightly over 90 degrees downwardly to form flanges 92. The sheet is then rolled into a helical configuration to define the pipe length. As the pipe length is being formed, an elongated formed rib 94 is directed over the adjacently disposed flanges 92 and is rolled into a helix about the flanges. The legs 96 of the ribs are then pressed inwardly by rollers 98 of pressing member 100 to secure together the adjacent flanges of the helical shape and form the pipe length. This method is illustrated in FIGS. 20 and 21 and the resulting pipe is shown in partial cross-section in FIG. 18. It should be noted that the interior spacing 102 under the rib 94 about the flanges could be filled with a filler material 104 such as polyurethane foam for protection against corrosion and the provision of a watertight seal, as shown under one portion of the rib in FIG. 18. FIG. 19 illustrates the use of this embodiment of the invention with an interior liner 28 held against the flanges 92 by rib 94 as well as an outer protective coating 68 which, as discussed above, could be extruded onto the pipe as shown in FIG. 5.

FIG. 22 illustrates yet another embodiment of the invention which is somewhat similar to the upstanding lock seam illustrated in FIG. 11. In this embodiment, however, the rib 110 is defined by a channel member 112 preferably formed of about 14 gauge steel and which is slightly bent at its mid-point 114 and is provided with inwardly facing hook portions 116 at the ends thereof. In constructing this embodiment of applicants' pipe, a liner 28 is disposed over the sheet of steel 11 such that the lateral edges of the liner are disposed over and adjacent to the lateral edges of the steel sheet as seen in FIG. 14. The lateral edges 11 and 11' of the sheet and liner are then rolled together by a suitable former to define channel hooks 118. The sheet and liner are then rolled into a helical configuration and the channel member 112 is directed over the then adjacently disposed channel hooks and rolled into a helix in the same manner as rib 94 in the embodiment illustrated in FIG. 19. The ends of the channel member 112 are then pressed inwardly as shown in FIG. 22 such that the hook portions 116 thereof interlock with the channel hooks 118 on the channel member 112 thereby securing together the lateral edges of the steel sheet 11 and liner 28 and forming the pipe section. As with the prior embodiment, a filler material can be injected into the space 120 formed by the channel member 112 above the interlocking end hooks 116 and 118.

In addition to providing the pipe 10 with an inert liner by means of extrusion as illustrated in FIG. 5, such a liner could also be secured by rotational casting. The use of conventional rotational casting to form the liner would comprise the steps of plugging the ends of the pipe 10 to effectively form a die with a charging hole for material, charging the interior of the pipe with a polyethylene, PVC or ABS powder through the hole, placing the pipe in an oven, heating the oven to about 520° Fahrenheit and, while in the oven, both rotate the pipe about its longitudinal axis and rock the pipe about a transverse center horizontal axis in a teeter-totter like motion. The rotation and rocking of the pipe evenly distributes the powder about the interior of the pipe which then sets up against the interior pipe wall and is held in place by that portion of the formed liner which is disposed within the tapered channels 20'. Such a process, however, contains certain drawbacks. The equipment for creating the rocking motion would be bulky and expensive in that it would have to withstand the high curing temperatures within the oven and, due to the rocking motion, would necessarily provide the pipe with polymer end caps which would have to be cut away. An alternative method which utilizes the rotational casting concept is illustrated in FIG. 25.

As seen in FIG. 25, the pipe 10 is provided with end plugs 150, one of which has a tube 152 of about 10 inches in diameter extending therethrough and along the interior length of the pipe. The relatively large diameter of the tubing allows the tubing to be insulated by suitable material 153 and/or fluid cooling so as to withstand the temperatures within the oven. Tubing 152 is also provided with a plurality of openings or nozzles 154 equally spaced longitudinally along the length thereof for discharging the powder of polymer against the interior pipe wall. The pipe 10 is supported on a roller assembly 156 for rotating the pipe about its center longitudinal axis within oven 156. With the oven at a temperature of about 520° Fahrenheit, the polymer powder is charged through the tube 152 and out nozzles 154 onto the interior pipe wall. As the powder passes through the tube 152, the pipe is rotated on the roller assembly 156 to provide an even distribution of the powder along the interior of the pipe wall. The liner then sets up within the oven as discussed above.

Each of the aforesaid embodiments of the present application provides a pipe which is not only more hydraulically efficient than conventional corrugated pipe but is readily adapted for having secured thereto an inert interior liner to resist corrosion.

If desired, the pipe 10 of the present invention as shown in FIG. 23 can be further strengthened by the addition of longitudinal stiffening ribs 122 which, while adding strength to the pipe, will not adversely affect the hydraulic efficiency and, in fact, may increase the efficiency as the added strength supplied by the stiffening ribs would allow the adjacent channels defined by the helical rib to be spaced further apart thereby increasing the velocity of fluid flow as illustrated by the graph shown in FIG. 24 and Manning's Equation. FIG. 23 illustrates the forming of ribs 122 which are formed in the steel sheet 11 by flying press dies 124 or other suitable means after the sheet passes through the channel former 27. In this manner, the ribs can be added without slowing the manufacturing process. FIGS. 23(A) and 23(B) illustrate alternative cross-sections for stiffening ribs 122.

Various other changes and modifications may be made in carrying out the present invention without departing from the spirit and scope, thereof. Insofar as these changes and modifications are within the purview of the appended claims, they are to be considered as part of the present invention.

We claim:

1. A hydraulically efficient underground pipe formed of single piece metal wall construction for use in buried storm drain applications, said pipe comprising:

a cylindrical metal wall;

a lock seam extending helically about and along the length of said wall;

a plurality of outwardly projecting ribs extending helically about and along the length of said wall and being integrally formed therewith, said ribs defining a corresponding plurality of open channels being adapted to render the pipe substantially rigid so as to possess sufficient structural strength to withstand the stresses of being buried underground, said metal wall including a plurality of openings formed therein between said ribs; and a liner extruded onto the interior of said metal wall.

2. The hydraulically efficient underground pipe as recited in claim 1 wherein said openings are defined by expanding said metal wall between said ribs.

* * * * *